United States Patent [19]

Mayer et al.

[11] Patent Number: 4,661,551

[45] Date of Patent: Apr. 28, 1987

[54] TRANSPARENT AQUEOUS ORGANOPOLYSILOXANE COMPOSITIONS

[75] Inventors: Hans Mayer; Bernward Deubzer, both of Burghausen; Petra Iretzberger, Simbach; Rudolf Mühlhofer, Burghausen, all of Fed. Rep. of Germany; Hermann Wilhelm, Braunau, Austria

[73] Assignee: Wacker-Chemie GmbH, Munich, Fed. Rep. of Germany

[21] Appl. No.: 787,841

[22] Filed: Oct. 16, 1985

[30] Foreign Application Priority Data

Dec. 28, 1984 [DE] Fed. Rep. of Germany ....... 3447636

[51] Int. Cl.$^4$ ............................................. C08K 5/05
[52] U.S. Cl. ............................. 524/379; 106/287.11; 524/385; 524/391; 524/765; 524/801; 524/831; 528/12; 528/25; 528/26; 528/33; 528/38
[58] Field of Search .................... 106/287.11; 524/379, 524/385, 391, 765, 801, 831; 528/38, 26, 25, 12, 33

[56] References Cited

U.S. PATENT DOCUMENTS 3,890,269  6/1975  Martin ................................... 528/14
3,960,575  6/1976  Martin ................................... 528/10
4,247,330  1/1981  Sanders, Jr. ...................... 106/287.11

FOREIGN PATENT DOCUMENTS 0068671  5/1983  European Pat. Off. .

Primary Examiner—Melvyn I. Marquis

[57] ABSTRACT

Transparent aqueous organopolysiloxane compositions comprising (A) a salt of a water-soluble organic or inorganic acid and a polysiloxane, which contains in addition to the other siloxane units siloxane units containing SiC-bonded monovalent radicals having basic nitrogen atoms in an amount of at least 0.5 percent by weight, based on the weight of the polysiloxane; and (B) an organic silicon compound having basic nitrogen atoms in an amount of from 0 to 0.5 percent by weight, based on the weight of the organic silicon compound; and when constituent (B) does not contain at least one organic silicon compound having a molecular weight greater than 600 g/mol in an amount of at least 0.1 part per part by weight of contituent (A), then an organic solvent (C) is present in an amount up to about 5 percent by weight based on the weight of constituent (A), in which the organic solvent is soluble in water up to about 1 part by weight per 100 parts by weight of water at 20° C. and 1020 hPa (abs.) and is free of halogen atoms.

The organopolysiloxanes may contain Si-bonded hydrogen as well as at least one SiC-bonded radical having a basic nitrogen atom in one and the same molecule.

8 Claims, No Drawings

TRANSPARENT AQUEOUS ORGANOPOLYSILOXANE COMPOSITIONS

The present invention relates to organopolysiloxanes and more particularly to aqueous organopolysiloxane compositions which are transparent.

BACKGROUND OF THE INVENTION

Organopolysiloxane compositions which form transparent mixtures when diluted with water are described in European Patent Application No. 0 068 671 to Dow Corning Limited. These compositions contain a salt of water-soluble organic or inorganic acid as well as an organopolysiloxane which in addition to the other siloxane units also contains siloxane units containing SiC-bonded radicals having basic nitrogen atoms, methyltrimethoxysilane, a silicon compound which is soluble in such a salt and a water-soluble solvent.

Even though European Patent Application No. 0 068 671 discloses octanol as an example of a water-soluble solvent, O A. Neumuller "Rompps Chemie-Lexikon", Stuttgart, 1974, page 2400, states that octanols are insoluble or only slightly soluble in water. Consequently, when the method of European Patent Application No. 0 068 671 is being practiced by those skilled in the art, only the actual water-soluble solvents mentioned in the patent application can be used.

It is, therefore, an object of the present invention to provide polysiloxane containing compositions which form transparent mixtures when diluted with water. Another object of the present invention is to provide polysiloxane containing compositions which are easily diluted with water. Still another object of the present invention is to provide polysiloxane containing compositions which are stable both in the undiluted form and when diluted with water. A further object of the present invention is to provide organopolysiloxanes containing both Si-bonded hydrogen atoms as well as at least one SiC-bonded radical having a basic nitrogen atom in the same molecule.

SUMMARY OF THE INVENTION

The foregoing objects and others which will become apparent from the following description are accomplished in accordance with this invention, generally speaking, by providing an organopolysiloxane composition which forms a transparent mixture when diluted with water comprising (A) a salt of a water-soluble organic or inorganic acid and a polysiloxane which, in addition to the other siloxane units, also contains siloxane units comprising SiC-bonded monovalent radicals having at least one basic nitrogen atom in an amount of at least 0.5 percent byweight based on the weight of the polysiloxane; and (B) an organic silicon compound containing a basic nitrogen in an amount of from 0 to 0.5 percent by weight based on the weight of the organosilicon compound, with the proviso that the organopolysiloxane composition contains no more than 5 percent by weight of a water-soluble organic solvent (C), based on the weight of constituent (A) and that the water-soluble organic solvent is soluble in water up to about 1 part by weight per 100 parts by weight of water and is free of octanol and halogen atoms.

DESCRIPTION OF THE INVENTION

The polysiloxanes, whose reaction with water-soluble organic or inorganic acids results in the formation of constituent (A), are preferably those consisting of units of the formula:

$$R_x R^1_y (OR^2)_z SiO_{\frac{4-x-y-z}{2}}$$

where R represents hydrogen or the same or different SiC-bonded monovalent organic radicals which are free of basic nitrogen; $R^1$ represents the same or different SiC-bonded monovalent radicals having a basic nitrogen atom; $R^2$ represents hydrogen or the same or different alkyl radicals having from 1 to 4 carbon atoms per radical; x represents 0, 1, 2 or 3, preferably an average of from 0 to 2 and more preferably from 0 to 1.8; y is 0 or 1, preferably an average of from 0.1 to 0.6 and more preferably from 0.15 to 0.30; and z represents 0, 1, 2 or 3, preferably an average of from 0 to 0.8, and more preferably from 0.01 to 0.6; and the sum of the averages of x, y and z does not exceed 3.4.

When the compositions of this invention are used, for example, as constituents for imparting hydrophobicity to building materials, and crosslinking of constituent (A) by water is desired, then z must on the average be at least 0.1. However, when crosslinking of constituent (A) by the action of water during or following the utilization of the compositions of this invention is not desired or required, as in the case when the compositions of this invention are used as a constituent to improve the luster or feel ["hand"] of artificial or natural leather, then it is preferred that z have a value of 0.

Examples of SiC-bonded organic radicals represented by R which are free of basic nitrogen are hydrocarbon radicals having from 1 to 20 carbon atoms per radical, such as alkyl radicals, e.g., the methyl, ethyl, n-propyl and the isopropyl radical, as well as the octyl and tetradecyl radicals; aliphatic hydrocarbon radicals having at least one double bond, such as the vinyl and allyl radicals, as well as butadienyl radicals; cycloaliphatic hydrocarbon radicals, such as the cyclopentyl and the cyclohexyl radicals, as well as the methylcyclohexyl radicals; aromatic hydrocarbon radicals, such as the phenyl and naphthyl radicals; alkaryl radicals, such as the tolyl radicals; and aralkyl radicals, such as the benzyl radical. The methyl and phenyl radicals are the preferred radicals. It is preferred that a hydrocarbon radical, preferably a methyl radical, also be bonded to each silicon atom which is bonded to a hydrogen atom, i.e., when R represents hydrogen.

Preferred SiC-bonded radicals having a basic nitrogen atom, which are represented by $R^1$ are those of the formula $$R_2^3 NR^4—$$

where $R^3$ represents hydrogen or the same or different alkyl or aminoalkyl radicals and $R^4$ is a divalent hydrocarbon radical.

The examples of alkyl radicals specified for R are equally applicable to the alkyl radicals represented by $R^3$. Nevertheless, it is preferred that at least one hydrogen atom be bonded to each nitrogen atom in the radicals represented by the following formula $$R_2^3 NR^4—.$$

Examples of divalent hydrocarbon radicals represented by $R^4$ are the methylene and the ethylene radicals, as well as propylene, butylene, cyclohexylene, octadecylene, phenylene and butenylene radicals. The n-propylene radical is the preferred divalent hydrocarbon radical because of its availability.

A preferred monovalent SiC-bonded radical having at least one basic nitrogen atom is that corresponding to the following formula

H$_2$N(CH$_2$)$_2$NH(CH$_2$)$_3$—.

Additional examples of SiC-bonded radicals having at least one basic nitrogen atom are those having the formulas

H$_2$N(CH$_2$)$_3$—

H$_2$N(CH$_2$)$_2$—

H$_3$CHN(CH$_2$)$_3$—

H$_2$N(CH$_2$)$_5$—

H(NHCH$_2$CH$_2$)$_3$— n—C$_4$H$_8$NH(CH$_2$)$_2$NH(CH$_2$)—.

Examples of alkyl radicals represented by R$^2$ are especially the methyl, ethyl and isopropyl radical.

The polysiloxanes which contain siloxane units in addition to siloxane units comprising SiC-bonded monovalent radicals having at least one basic nitrogen atom may be prepared, for example, by the equilibration or condensation of, for example, gamma-aminoethylaminopropyltrimethoxysilane or gammaaminoethylaminopropylmethyldimethoxysilane or mixtures of such silanes with organic polysiloxanes which are free of basic nitrogen. It is preferred that the polysiloxanes have a molecular weight of at least 350 g/mol. These polysiloxanes may, for example, be monoorganopolysiloxanes, such as monoalkyl- or monoarylpolysiloxanes, for examples those corresponding to either of the following two general formulas CH$_3$Si(OC$_2$H$_5$)$_{0.8}$O$_{1.1}$ or C$_6$H$_5$Si(OC$_2$H$_5$)$_{0.72}$O$_{1.14}$.

Other polysiloxanes which may be employed are hydrolysates of isooctyltrichlorosilane, co-hydrolysates of phenyltrichlorosilane and n-propyltrichlorosilane, methoxy containing copolymers consisting of monomethylsiloxane and monoisooctylsiloxane units, trimethylsiloxy end-blocked dimethylpolysiloxanes, dimethylpolysiloxanes containing an Si-bonded hydroxyl group in each of their terminal units, dimethylpolysiloxanes whose terminal units are those of the following formula

—SI(CH$_3$)$_2$OR$^2$ where R$^2$ is the same as above, as well as polyethylsilicates, methylhydrogenpolysiloxanes and copolymers comprising, for example, dimethylsiloxane and methylhydrogensiloxane and/or monomethylsiloxane units.

It is preferred that the organopolysiloxanes of this invention which contain both Si-bonded hydrogen as well as at least one SiC-bonded radical having a basic nitrogen atom in the same molecule be of a type that can be prepared by equilibrating a trimethylsiloxy end-blocked methylhydrogenpolysiloxane with gamma-aminoethylaminopropyltrimethoxysilane.

The water-soluble organic or inorganic acids which are used in the preparation of constituent (A) of the composition of this invention may be the same organic or inorganic acids which have been or could have been used heretofore in the preparation of salts of water-soluble organic or inorganic acids and polysiloxanes containing SiC-bonded radicals having at least one basic nitrogen atom. Examples of such acids are hydrochloric acid, sulfuric acid, acetic acid, propionic acid and diethylhydrogen phosphate. Acetic acid and propionic acid are the preferred organic acids.

Compounds which are used in preparing constituent (A) of this invention are well known. In addition to European Patent Application No. 0 068 671, other patents which disclose these compounds are, for example, U.S. Pat. No. 3,890,269 to Martin; U.S. Pat. No. 3,335,424 to Brown; and U.S. Pat. No. 4,247,330 to Sanders, Jr.

Examples of organic silicon compounds (B) having a basic nitrogen in an amount of from 0 to 0.5 percent by weight, based on the weight of the organic silicon compounds, are tetraalkoxysilanes such as tetraethylsilicate; organoalkoxysilanes or organoalkoxyalkylenoxysilanes, such as dimethyldimethoxysilane, methyltrimethoxysilane, phenyltrimethoxysilane, vinyltrimethoxysilane, n-octyltrimethoxysilane, isooctyltrimethoxysilane, 2-ethylhexyltrimethoxysilane, methyltris-(methoxyethylenoxy)silane, dimethyldiethoxysilane and n-octadecyltrimethoxysilane; siloxanes containing 2 to 10 siloxane units per molecule, such as hexamethyldisiloxane, 1,1,3,3-tetramethoxy-1,3-dimethyldisiloxane and 1,1,3,3-tetramethyl-1,3-divinyldisiloxane, in which all of the above examples of polysiloxanes are free of a basic nitrogen atom.

Other organic silicon compounds (B) are siloxanes of the formula

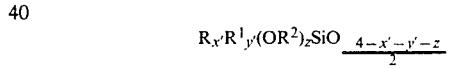

where R, R$^1$, R$^2$ and z are the same as above, x' represents 0, 1, 2 or 3, preferably an average from 0 to 2, and y' is 0 or 1, preferably an average of 0.01, which corresponds to a basic nitrogen content that does not exceed 0.5 percent by weight based on the weight of the respective siloxane.

It is preferred that constituent (B) be present in the compositions of this invention in an amount of from about 0.1 to about 7 parts by weight, and more preferably from about 1.2 to about 4 parts by weight per part by weight of constituent (A).

When constituent (B) is not present, in an amount of at least 0.1 part by weight per part by weight of constituent (A) and comprises at least one organic silicon compound having a molecular weight which does not exceed 600 g/mol and more preferably no more than 500 g/mol, then the compositions of this invention must contain in addition to constituents (A) and (B), constituent (C), an organic solvent other than octanol, which at 20° C. and at 1020 hPa (abs.) is soluble in water in an amount which does not exceed 1 part by weight per 100 parts by weight of water, and which is free of halogen atoms. Examples of preferred solvents of this type are carboxylic acid esters, such as ethyl acetate and n-butyl acetate, as well as aromatic hydrocarbons, such as toluene and xylenes. Additional examples of suitable solvents are aliphatic alkanols, except for octanol, having from 4 to 18 carbon atoms per molecule such as n-butanol, amyl alcohol, n-hexanol and n-heptanol.

It is preferred that constituent (C) be used in an amount of from 0.1 to 2.0 parts by weight and more preferably from about 0.2 to 1.0 part by weight per part by weight of constituent (A).

The compositions of this invention are prepared by mixing the polysiloxane which, in addition to the other siloxane units, also contains siloxane units containing SiC-bonded radicals having basic nitrogen atoms in an amount of at least 0.5 percent by weight of basic nitrogen, based on the weight of the polysiloxane, with a water-soluble organic or inorganic acid in order to form constituent (A), and then constituent (A) is mixed with constituent (B) and, if necessary, with constituent (C). Generally, mixing is preferably carried out at a temperature between 70° C. and 100° C. in preparing the clear solution.

The compositions of this invention which are diluted with water, may be used to improve the luster and feel ["hand"] of synthetic or natural leather, as hydrophobic agents for concrete, as additives for gypsum, putty and water-dilutable paints, as hydrophobic agents for building materials, roads and bridges, to prevent humidity from rising in holes found in walls, for impregnating fine-particulate inorganic substances such as perlite, vermiculite or fillers, to impart hydrophobicity to metals, textiles, leather or paper, as additives for polishing agents, as agents for imparting water repellency to insulating materials, as dispersing agents or as additives during the polymerization of monomers containing aliphatic carbon-carbon double bonds, such as vinyl chloride or vinyl acetate and to improve the flow characteristics of water-miscible lacquers, including lacquers used for cataphoretic electric immersion lacquering, as well as all other applications employing water-diluted organic silicon compounds.

The preparation of organopolysiloxanes having a basic nitrogen atom are described hereinbelow, in which all percentages and parts are by weight unless otherwise specified.

(a) To a one-liter three-necked flask equipped with a stirrer, a dropping funnel and a reflux condenser, is added with constant agitation a mixture consisting of 250 g of a copolymer of phenyltrichlorosilane and n-propyltrichlorosilane in a molar ratio of 2:1 and having an average molecular weight of 1500 g/mol and from 5.4 to 7.4 percent of Si-bonded hydroxyl groups in 250 g of toluene and 0.1 g of KOH in 2 g of methanol and heated to 100° C. Over a period of one hour, 103.5 g of N-(2-aminoethyl)-3-aminopropyltrimethoxysilane is added dropwise. The mixture is then heated to boiling and refluxed for an additional 6.5 hours and subsequently cooled to 30° C. Thereafter, 1.17 ml of 10 percent hydrochloric acid is added to the flask. After 172 g of the contents of the flask have been distilled off, 172 g of toluene are added and then the solution thus obtained is filtered. The resultant organopolysiloxane contains 3.7 percent of basic nitrogen based on the weight of the composition.

(b) To the apparatus described in (a) above is added with constant stirring a mixture containing 0.2 g of KOH in 4 g of methanol and 500 g of an organopolysiloxane having the following general formula $$CH_3Si(OC_2H_5)_{0.8}O_{1.1}$$

in which the average molecular weight is about 600 g/mol and has a viscosity of about 20 mm$^2$.s$^{-1}$. About 150 g of N-(2-aminoethyl)-3-aminopropyltrimethoxysilane is then added and the mixture thus obtained is heated to boiling under reflux for 6 hours. The mixture is then cooled to 30° C. and mixed with 2.5 ml of 10 percent hydrochloric acid. After heating to 140° C., the methanol is distilled off and the organopolysiloxane thus obtained is filtered to remove the KCl. The organopolysiloxane contains 2.9 percent of basic nitrogen based on the weight of the organopolysiloxane.

(c) The method described under (b) above is repeated, except that 500 g of a dimethylpolysiloxane containing an Sibonded hydroxyl group in each of its terminal units and having an average molecular weight of about 4000 g/mol is substituted for the monomethylpolysiloxane. The organopolysiloxane thus obtained contains 2.9 percent of basic nitrogen, based on the weight of the organopolysiloxane.

(d) The method described under (b) above is repeated, except that 500 g of an organopolysiloxane having the general formula $$C_6H_5Si(OC_2H_5)_{0.72}O_{1.14}$$

and having an average molecular weight of about 3000 g/mol and a viscosity of about 25,000 mm$^2$.s$^{-1}$ at 25° C. is substituted for the monomethylpolysiloxane. The organopolysiloxane thus obtained contains 2.9 percent basic nitrogen, based on the weight of the organopolysiloxane.

(e) The method described under (b) above is repeated, except that 250 g of a hydrolysate of isooctyltrichlorosilane having an average molecular weight of about 2000 g/mol in 250 g of toluene is substituted for the monomethylpolysiloxane. The resultant polysiloxane contains 1.4 percent of basic nitrogen, based on the weight of the polysiloxane.

(f) The method described under (b) above is repeated, except that 500 g of a copolymer comprising methoxy groups and consisting of 75 mol percent of monomethylsiloxane and 25 mol percent monoisooctylsiloxane units having an average molecular weight of about 400 g/mol is substituted for the monomethylpolysiloxane. The resultant organopolysiloxane contains 2.9 percent of basic nitrogen, based on the weight of the organopolysiloxane.

(g) A mixture containing 399 g of a trimethylsiloxy endblocked methylhydrogenpolysiloxane having a viscosity of about 20 mm$^2$.s$^{-1}$ at 25° C. and 165 g of N-(2-aminoethyl)-3-aminopropyltrimethoxysilane is heated to boiling under reflux for 6 hours. The resultant organopolysiloxane contains 3.7 percent of nitrogen, based on the weight of the organopolysiloxane.

(h) To the apparatus described in (a) above is added a mixture consisting of 0.2 g of KOH in 4 g of methanol and 500 g of a polyethylsilicate having an average molecular weight of about 450 g/mol and a viscosity of 4 mm$^2$.s$^{-1}$ and 150 g of N-(2-aminoethyl)-3-aminopropyltrimethoxysilane. The resultant mixture is heated for 6 hours at 100° C., cooled to 30° C. and then mixed with 2.5 ml of 10 percent hydrochloric acid. About 1.06 g of the contents of the flask are distilled off by heating the mixture to 130° C. and then the polysiloxane is filtered to remove the KCl. The resultant polysiloxane contains 3.7 percent basic nitrogen, based on the weight of the polysiloxane.

(i) To the apparatus described in (a) above is added a mixture consisting of 0.4 g of KOH in 8 g of methanol and 600 g of a trimethylsiloxy end-blocked dimethylpolysiloxane having a 5 viscosity of 350 mm$^2$.s$^{-1}$ at 25° C. and 200 g of N-(2-aminoethyl)3-aminopropylmethyldimethoxysilane. The resultant mixture is heated for 1.5 hours at 140° C., then cooled to 30° C. and then mixed with 5 ml of 10 percent hydrochloric acid. The mixture is heated until 10 g of the contents of the flask are distilled off and the resultant organopolysiloxane is filtered to remove the KCl. The resultant organopolysiloxane contains 3.5 percent of basic nitrogen, based on the weight of the organopolysiloxane.

EXAMPLE 1

About 40 g of the organopolysiloxane containing basic nitrogen, whose preparation is described in (c) above, are mixed with 5 g of glacial acetic acid, 80 g of an organopolysiloxane corresponding to the following general formula $$CH_3Si(OC_2H_5)_{0.8}O_{1.1}$$

having an average molecular weight of 600 g/mol and 10 g of n-butyl acetate and heated to 90° C. A clear mixture is formed. one part of the mixture is mixed with 500 parts of water and forms a transparent mixture. The resultant transparent mixture is then mixed with a sufficient amount of perlite to form a brushable paste. After drying for 24 hours, the perlite is mixed with water at room temperature. It absorbs only 13 percent water, based on its weight, while untreated perlite, when mixed with water, absorbs 400 percent water based on its weight.

COMPARISON EXAMPLE A

The method described in Example 1 is repeated, except that 10 g of ethylene glycol are substituted for the butyl acetate. The mixture forms a gel when heated to 90° C.

COMPARISON EXAMPLE B

The method described in Example 1 is repeated, except that 10 g of glycerine are substituted for the butyl acetate. The mixture forms a gel when heated to 90° C.

COMPARISON EXAMPLE C

The method described in Example 1 is repeated, except that 10 g of methanol are substituted for the butyl acetate. Even after heating for 20 hours at 90° C., the mixture is not clear. When diluted with water, it yields a milky mixture which quickly phase separates.

EXAMPLE 2

The method of Example 1 is repeated, except that 10 g of the following silanes or siloxanes are substituted for the 10 g of butyl acetate:
dimethyldimethoxysilane;
dimethyldiethoxysilane;
phenyltrimethoxysilane;
isooctyltrimethoxysilane;
n-octyltrimethoxysilane;
n-octadecyltrimethoxysilane;
vinyltrimethoxysilane;
hexamethyldisiloxane;
1,1,3,3-tetramethoxy-1,3-dimethyldisiloxane; or
1,1,3,3-tetramethyl-1,3-divinyldisiloxane.

Identical results are obtained in each case, including the results of the perlite treatment.

EXAMPLE 3

About 40 g of the organopolysiloxane having basic nitrogen, whose preparation is described in (a) above, are mixed with 20 g of glacial acetic acid, 20 g of toluene and 20 g of a trimethylsiloxy end-blocked methylhydrogenpolysiloxane which has a viscosity of about 20 mm$^2$.s$^{-1}$ at 25° C. and then agitated for 20 minutes. A clear solution is obtained. A transparent mixture is obtained when one part of the resultant mixture is mixed with 199 parts of water. The transparent mixture is mixed with gypsum and after two hours, the treated gypsum is immersed in water. It absorbs less than 10 percent of water, based on the weight of the treated gypsum.

EXAMPLE 4

About 100 g of the organopolysiloxane containing basic nitrogen atoms, whose preparation is described in (b) above, are mixed with 50 g of glacial acetic acid, 25 g of n-butyl acetate and 100 g of an organopolysiloxane having the general formula $$CH_3Si(OC_2H_5)_{0.8}O_{1.1}$$

in which the molecular weight is about 600 g/mol, and then heated for 9 hours at 90° C. A clear solution is obtained. When a portion of the resultant mixture is diluted with 500 parts of water and used to treat perlite in accordance with the procedure described in Example 1, the same results are obtained.

EXAMPLE 5

About 40 g of the organopolysiloxane containing basic nitrogen atoms, whose preparation is described in (c) above, are mixed with 5 g of glacial acetic acid, 10 g of dimethyldimethoxysilane and 80 g of the organopolysiloxane described in Example 4, which has a molecular weight of 600 g/mol, and then heated for 4.75 hours at 90° C. A clear solution is obtained. About 3.5 parts of this mixture are then mixed with 96.5 parts of a commercially available aqueous lime-based paint. After a coating of the treated paint has dried, a drop of water is placed on the dried paint. The water evaporates before it can penetrate the coating.

The same result is obtained when the lime-based paint is replaced with a commercially available silicate paint.

EXAMPLE 6

About 100 g of the organopolysiloxane containing basic nitrogen atoms, whose preparation is described in (d) above, are mixed with 50 g of phenyltrimethoxysilane and 100 g of the organopolysiloxane described in Example 4, which has a molecular weight of 600 g/mol, and then heated for 10 hours at 90° C. A clear solution is obtained. About 3.5 parts of the mixture are added to 96.5 parts of water to form a transparent mixture. The transparent mixture is used in the preparation of a commercial plaster. After storing the plaster specimen at room temperature for 2 hours, it is immersed in water. It absorbs only 1.5 percent water, based on the weight of the plaster specimen, whereas an untreated specimen absorbs 14 percent water, based on the weight of the untreated plaster specimen.

EXAMPLE 7

About 200 g of the organopolysiloxane containing basic nitrogen atoms, whose preparation is described in (e) above, are mixed with 100 g of acetic acid, 20 g of n-hexanol and 100 g of isooctyltrimethoxysilane and heated for 3 hours. A clear solution is obtained. After diluting one part of the mixture with 9 parts of water, a transparent mixture is obtained. A hole in a brick wall is coated with the transparent mixture and then exposed to water over a period of 24 hours. The coating provides an effective barrier against water rising in the wall.

EXAMPLE 8

About 40 g of the organopolysiloxane containing basic nitrogen atoms, whose prepartion is described in (f) above, are mixed with 5 g of glacial acetic acid, 20 g of amyl alcohol and 80 g of isooctyltrimethoxysilane and then heated for 3 hours at 90° C. A clear solution is obtained. One part of the mixture is then diluted with 5 parts of water to form a transparent mixture. About 2 percent of this mixture is mixed with other constituents which are used in preparing concrete. After hardening, the concrete exhibits a high degree of water repellency.

EXAMPLE 9

About 20 g of the organopolysiloxane containing basic nitrogen atoms, whose preparation is described in (g) above, are mixed with 10 g of glacial acetic acid, 10 g of n-hexanol and 40 g of a trimethylsiloxy end-blocked methylhydrogenpolysiloxane having a viscosity of 20 mm$^2$.s$^{-1}$ at 25° C. A clear solution is obtained within about 20 minutes at room temperature. When about 5 parts of this solution are diluted with 95 parts of water, a transparent mixture is obtained. Commercial filter paper is immersed in the transparent mixture and then water is sprayed on the filter paper so that it is damp, but the paper is not wet. There is no apparent difference between the feel or "hand" of the treated filter paper and the untreated filter paper.

EXAMPLE 10

About 40 g of the organopolysiloxane containing basic nitrogen atoms, whose preparation was described in (b) above, are mixed with 20 g of glacial acetic acid, 20 g of amyl alcohol and 120 g of the organopolysiloxane described in Example 4, which has a molecular weight of 600 g/mol and t for 3 hours at 90° C. A clear solution is obtained. One part of the mixture is then diluted with 9 parts of water to form a transparent mixture. The transparent mixture is poured into an electrophoresis vat that is used for cathodic electro-immersion coating. At a voltage of 55 V, a piece of sheet metal on the cathode is coated within 3 minutes with a film having a thickness of about 150 microns which after heating for one hour at ° C., displays outstanding water repellency.

What is claimed is:

1. A polysiloxane composition that forms a transparent mixture when diluted with water comprising
   (A) a water-soluble organic or inorganic acid salt of a polysiloxane comprising siloxane units having SiC-bonded monovalent radicals with basic nitrogen atoms of the formula R$_2^3$NR$^4$, where R$^3$ is selected from the group consisting of hydrogen, alkyl and aminoalkyl radicals and R$^4$ is a divalent hydrocarbon radical, in which the basic nitrogen atoms are present in an amount of at least 0.5 percent by weight of basic nitrogen atons based on the weight of the polysiloxane;
   (B) an organic silicon compound free of basic nitrogen atoms, in which the composition does not contain any water-soluble solvent and halogen atoms or octanols.

2. The composition of claim 1, wherein constituent (B) is an organic silicon compound having a molecular weight below 600 g/mol and is present in the composition in an amount of at least 0.1 part per part by weight of constituent (A), said composition also contains in addition to constituents (A) and (B), an organic solvent (C) which is soluble in water to the extend of 1 part by weight per 100 parts by weight of water at 20° C. and at 1020 hPa (abs.) and is selected from the group consisting of carboxylic acid esters, aromatic hydrocarbons, amyl alcohol, n-hexanol and n-heptanol.

3. The composition of claim 1, wherein the polysiloxane of constituent (A) is represented by the formula

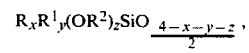

R is selected from the group consisting of hydrogen and an SiC-bonded monovalent organic radical which is free of basic nitrogen, R$^1$ is an SiC-bonded monovalent radical having a basic nitrogen atom, R$^2$ is selected from the group consisting of hydrogen and an alkyl radical having from 1 to 4 carbon atoms, x has an average value of from 0 to 2, y has an average value of from 0.1 to 0.6 and z has an average value of from 0 to 0.8, and the sum of x, y and z is up to 3.4.

4. The composition of claim 1, wherein the organic silicon compound (B) is represented by the formula

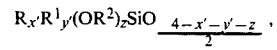

R is selected from the group consisting of hydrogen and an SiC-bonded monovalent orgaic radical which is free of basic nitrogen, R$^1$ is an SiC-bonded monovalent radical having a basic nitrogen atom, R$^2$ is selected from the group consisting of hydrogen and an alkyl radical having from 1 to 4 carbon atoms, x' has a value of 0, 1,2 or 3, y' is 0, z has a value of 0, 1, 2 or 3.

5. The composition of claim 1, wherein the organic silicon compound (B) is present in an amount of from 0.1 to about 7 parts by weight based on the weight of (A).

6. The composition of claim 1, wherein the polysiloxane contains both Si-bonded hydrogen and at least one Si-bonded radical having a basic nitrogen atom in the same molecule.

7. The polysiloxane of claim 6, which is obtained from the equilibration of a trimethylsiloxy end-blocked methylhydrogen-polysiloxane and gamma-aminoethylaminopropyltrimethoxysilane.

8. A polysiloxane composition that forms a transparent mixture when diluted with water comprising
   (A) a water-soluble organic or inorganic salt of a polysiloxane, in which the polysiloxane has the formula

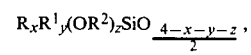

R is selected from the group consisting of hydrogen and an SiC-bonded monovalent organic radical which is free of basic nitrogen, $R^1$ is an SiC-bonded monovalent radical having basic nitrogen atoms of the formula $R_2^3NR^4$, $R^2$ is selected from the group consisting of hydrogen and an alkyl radical having from 1 to 4 carbon atoms, $R^3$ is selected from the group consisting of hydrogen, alkyl and aminoalkyl radicals and $R^4$ is a divalent hydrocarbon radical, x has an average value of from 0 to 2, y has an average value of from 0.1 to 0.6 and z has an average value of from 0 to 0.8, and the sum of x, y and z is up to 3.4, in which the basic nitrogen atoms are present in an amount of at least 0.5 percent by weight based on the weight of the polysiloxane;

(B) an organic silicon compound having the formula $$R_{x'}R^1_{y'}(OR^2)_zSiO_{\frac{4-x'-y'-z}{2}},$$

R is selected from the group consisting of hydrogen and an SiC-bonded monovalent organic radical which is free of basic nitrogen, $R^1$ is an SiC-bonded monovalent radical having a basic nitrogen atom, $R^2$ is selected from the group consisting of hydrogen and an alkyl radical having from 1 to 4 carbon atoms, x' has a value of 0, 1, 2 or 3, y' has an average value of 0.01 and z has a value of 0, 1, 2 or 3, in which the composition does not contain any water-soluble solvent, octanols and halogen atoms.

* * * * *